Oct. 3, 1950 — S. SLESINGER — 2,524,276
METHOD OF MAKING A MOTION PICTURE FILM WITH BALLOON LEGENDS THEREON
Filed July 2, 1946 — 2 Sheets-Sheet 1
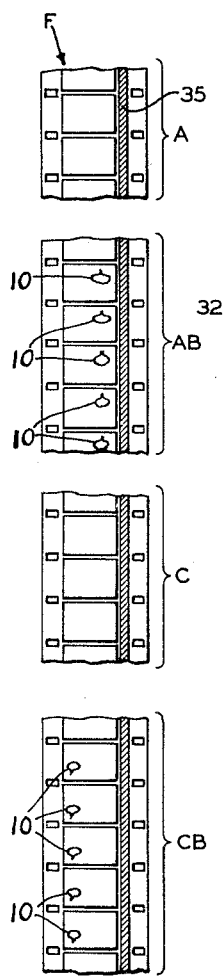
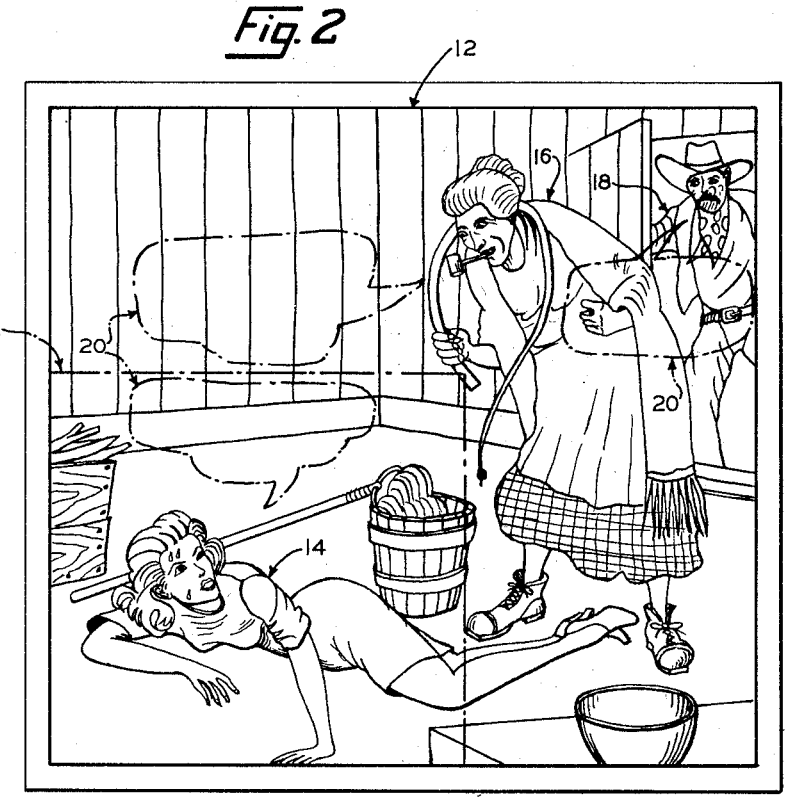
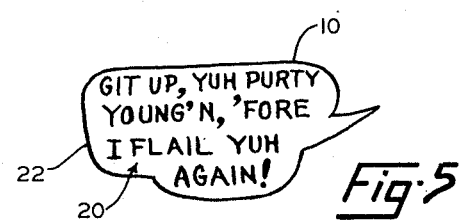
INVENTOR
STEPHEN SLESINGER
BY
ATTORNEY Oct. 3, 1950　　　　S. SLESINGER　　　　2,524,276
METHOD OF MAKING A MOTION PICTURE FILM
WITH BALLOON LEGENDS THEREON
Filed July 2, 1946　　　　　　　　　　2 Sheets-Sheet 2
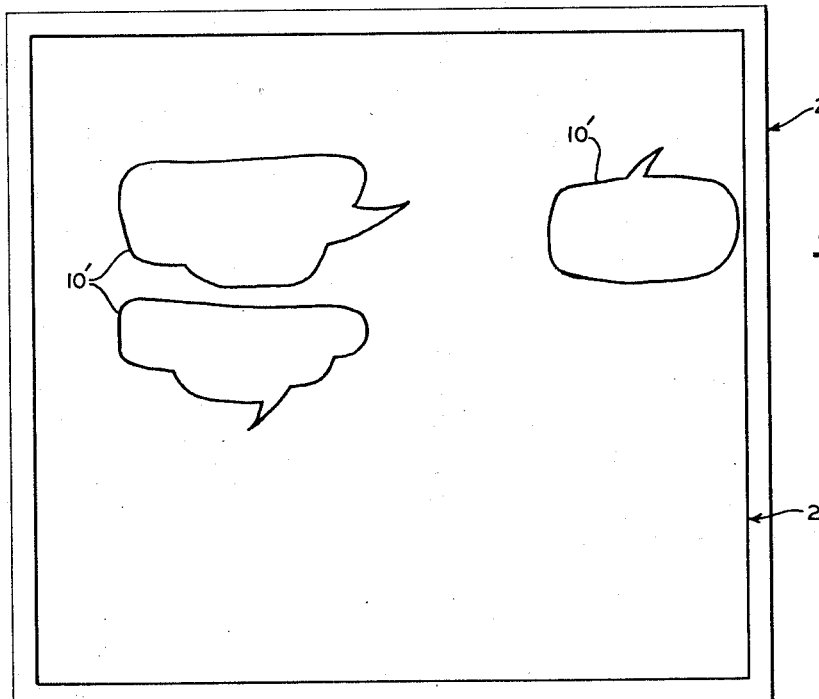
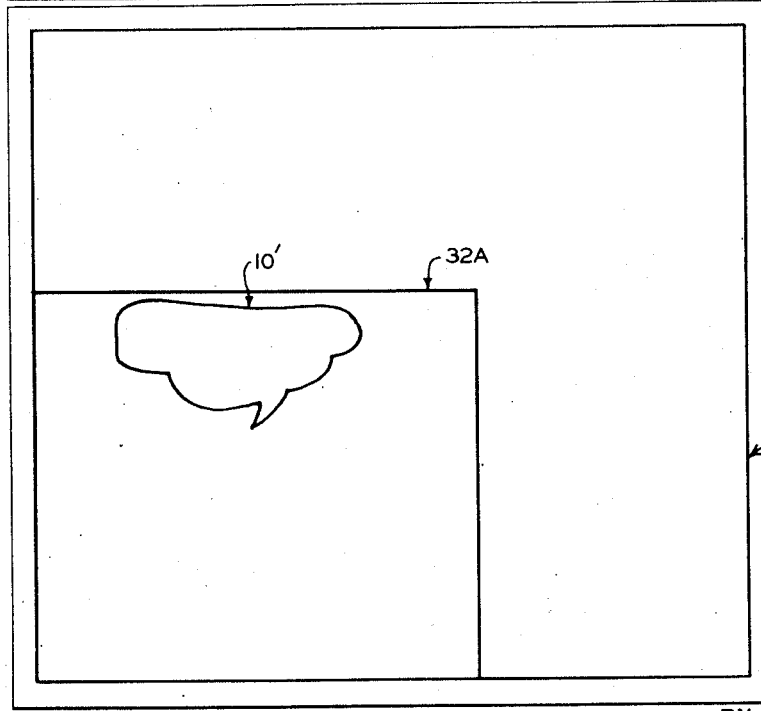
INVENTOR
STEPHEN SLESINGER
BY
ATTORNEY Patented Oct. 3, 1950

2,524,276

UNITED STATES PATENT OFFICE 2,524,276

METHOD OF MAKING A MOTION-PICTURE FILM WITH BALLOON LEGENDS THEREON

Stephen Slesinger, Redding Ridge, Conn.

Application July 2, 1946, Serial No. 681,002

6 Claims. (Cl. 88—16)

This invention relates to a method of making motion picture films.

The primary object of the present invention is the provision of a method of making motion picture films from a series of still pictures at least some of which include the representation of one or more characters which are supposed to talk as indicated by what is known as balloons which appear on and disappear from the film in various frames thereof in such manner as to effectively create, when the film is projected, the illusion of actual motion pictures. In this connection, it is an object of the invention to enable the same still pictures to be photographed on the motion picture film both with and without a particular balloon which may be associated with the respective still pictures.

Another object of the invention is to facilitate the photographing on the motion picture film of the still picture and of a "close-up" view of a part of the same still picture.

The above and other objects, features and advantages of the present invention will be fully understood from the following description considered in connection with the accompanying illustrative drawings.

In the drawings:

Fig. 1 is a view of a part of a motion picture film produced in accordance with the method of the present invention;

Fig. 2 is a view illustrating more or less diagrammatically one of a series of still pictures which are photographed in producing the motion picture film illustrated in Fig. 1;

Fig. 3 is a view illustrating more or less diagrammatically a device utilized as an aid in locating the position of particular balloon or the positions of a plurality of balloons, as the case may be, on a companion still picture;

Fig. 4 is a view illustrating more or less diagrammatically a device utilized for facilitating the photographing of a "close-up" view of a part of a companion still picture;

Fig. 5 is a view of a balloon carrying member which is superposed on a companion still picture when the latter, together with the balloon thereon, is to be photographed in accordance with the method of the present invention.

In accordance with the present invention, a series of still pictures are photographed individually on each of a series of successive frames of a motion picture film by means of a motion picture camera, the still pictures of the series being usually related to each other to simulate successive movements in a portrayal of motion, so as to tell a story, and at least some of the still pictures including characters which are supposed to speak, as indicated by devices known as balloons such as, for example, those on comic strips or cartoons which appear in newspapers or magazines. One of such balloons is illustrated in Fig. 5, by way of example, said balloon consisting of an outline 10 around the words or sounds which are supposed to be uttered by the particular character represented on the still picture with which the particular balloon is associated. It will be understood that the still picture may include more than one character and that there may be either one balloon or a plurality of balloons for each still picture and that where there are a plurality of balloons the latter may be associated with the same character or with different characters on the same still picture. The still pictures which are photographed on the film, in accordance with the present invention, as will more fully hereinafter appear, may be in the form of drawings, prints of drawings, photographs, prints of photographs, models, etc., or other inanimate or stationary subjects in black and white or in other colors. The motion picture film on which the series of still pictures are photographed may be of any size suitable either for home projection, television reproduction, or for projection in a motion picture theatre or auditorium. Without being limited thereto, it may be stated that the present invention is particularly well adapted for the production of 16 mm. motion picture films, especially when the motion pictures are to be projected on the smaller screens used in the home or for projection for television broadcast.

One of the still pictures of the series of the still pictures photographed on the motion picture film is illustrated more or less diagrammatically in Fig. 2. For the purpose of facilitating the illustration of the invention, said diagrammatic illustration of the still picture within the border 12 includes a plurality of characters indicated by the outlines 14, 16 and 18, respectively. Fig. 2 also shows in dotted lines a number of balloons which are associated with the characters 14, 16 and 18, respectively, but it will be understood that the still pictures do not have the balloons drawn or printed thereon. More particularly, each balloon is constituted by a removable element, for example, a piece of paper 20 having the peripheral edge contour approximately the shape of the balloon outline 10 (Fig. 5) which outline may, of course, vary in contour. Thus, as here shown, the peripheral edge 22 of the balloon element 20 illustrated in Fig. 5 corresponds in shape to the outline 10 of the balloon. The outline 10 may be drawn or printed on element 20, in black or any other color suitable for reproduction on the motion picture film, and preferably said outline is close to or at the peripheral edge 22 of the balloon carrying element 20. In Fig. 2 the several balloons 20 are illustrated as being of different peripheral-edge contours so that it may be clear that one or more balloons which may be different in outline are ordinarily utilized in photographing the still picture on the motion picture film.

As the still picture and the companion balloons are ordinarily separate from each other, provision is made in accordance with the present invention to facilitate the proper location of the balloons on the companion still picture in proper relation to the characters of the still picture with which the balloons are associated, respectively. For this purpose, there is provided a translucent sheet or guide member 24 which is preferably formed of tissue paper, but which can be formed of any other translucent or light permeable material and which carries thereon the positioning or guide outlines 10' for the balloons in the positions which correspond to the positions of the balloons on the still picture as illustrated, for example, in Fig. 2. It will be understood that a guide member 24 is provided for each still picture and that more than one such balloon-guide member may be provided for one or more companion still pictures when a particular character on said companion still picture is supposed to make more than one statement.

As illustrative of the method of producing the motion picture films from the series of still pictures and from the balloons associated therewith, Fig. 1 of the accompanying drawings will now be referred to more particularly. First, one of the still pictures of the related series of still pictures is photographed by means of a motion picture camera on a series of successive frames of the motion picture film, after which the same still picture having a balloon thereon in association with its character of the still picture is photographed on a series of successive frames of the film, as a continuation of said first mentioned series of frames on which the still picture without the balloon was photographed. Thus, for example, the group of frames indicated by the reference character A contain photographs of the same still picture but without a balloon, and the group of frames indicated by the reference character AB contain photographs of the same still picture but with a balloon superimposed thereon. Similarly the next still picture of the series is photographed without the balloon superimposed thereon on a series of successive frames of film as indicated at C, and then the same still picture but with a balloon superimposed thereon is photographed on a series of successive frames of the film indicated at CB. It will be understood that while in Fig. 1 two different still pictures of the series are indicated as photographed on the film F in succession with a balloon in a particular position on the companion still picture, the same still picture may be photographed on the film, on a plurality of series of successive frames, with the different balloons in different positions on the companion still picture but near enough to the character with which the particular balloon is associated so that when the film is projected the observer readily recognizes which character "speaks" the words within the balloon. The photographing of the same still picture with the different balloons in different positions in relation to the associated character enhances the motion picture illusion when the film is projected.

An important feature of the method of the present invention resides in photographing the balloons on the companion still pictures in such manner as to effectively create the motion picture film illusion when the films are projected. For this purpose, at least some of the balloons, when being photographed on the film during the production thereof from the series of still pictures are snapped-in and/or snapped-out. When some of the balloons are snapped-in or snapped-out, they will appear and disappear abruptly, and this materially improves the desired motion effect. Also, the filming of the balloons in different positions on the companion still picture, even when the balloons relate to the same character of the still picture, aid considerably in creating the desired motion effect when the film is projected on the viewing screen.

In providing for carrying out the method for the present invention, a script or set of instructions is furnished to the cameraman or photographer together with a series of related still pictures and a series of companion balloon guide elements hereinbefore described with reference to Fig. 3. It will be understood that in following the script the cameraman operates the motion picture camera for photographing the still picture on each of the required number of frames of the film, without the balloon on the still picture. Then the cameraman stops the camera and places one of the balloon-guide members 24 on the still picture with the rectangular or other border 24A of the guide member in registry with the border 12 of the companion still picture. The balloon positioning outlines 10' indicate to the cameraman the positions of the respective balloons on the companion still picture, and accordingly the cameraman places the balloons directly on the surface of the still picture, in the proper positions indicated by the balloon positioning outlines 10' on the guide member, and then after the guide member is removed, the cameraman photographs the still picture with the balloons thereon on the required number of successive frames of the film. In this connection it will be understood that the number of frames of the film on which the photograph of the still picture with the companion balloon or balloons thereon is photographed will vary with the amount of reading matter within the balloon so that when the film is reproduced by projecting it onto the screen, the audience may have sufficient time to read the subject matter of the balloon or of the balloons, if more than one balloon is photographed on the corresponding series of frames.

Further, in accordance with the present invention, provision is made for guiding the cameraman or photographer in photographing a "close-up" view of a part of a particular still picture. For example, the complete motion picture film produced from the series of related still pictures may include, and ordinarily will include, a number of "close-up" views of at least several of the still pictures. The present invention enables the same still picture to be utilized for photographing the "close-up" view on the film. For this purpose a "close-up" guide member or overlay 30 is provided as illustrated more or less diagrammatically in Fig. 4. Said "close-up" guide member is preferably formed of tissue paper but can, of course, be formed of any other suitable translucent or light permeable material. Referring to Fig. 4 in comparison with Fig. 2, and assuming that it is desired to take a "close-up" motion picture photograph of the particular view of the still picture shown in Fig. 2 as indicated by the dot and dash outline 32, the photographer would place the "close-up" guide member 30 on the still picture with the border 30A of said guide member in registry with the border 12 of the still picture, whereupon the outline 32A on the "close-up" guide member 30 would outline the part of the still picture corresponding to the outline 32 of which a "close-up" view is to be taken. Then the cameraman would adjust the camera to take the "close-up" view as thus determined by the outline 32A of the guide member 30 and thereafter, having removed the guide member from the still picture, the motion picture camera would be operated for photographing the "close-up" view on the motion picture film F. It will be noted that the guide member 30 may be provided with the positioning outline of a balloon as indicated at 10' in Fig. 4 so that the same guide member may be used to guide the cameraman to enable him to more easily locate the position of the balloon on the still picture for a "close-up" view of a part of the latter with a balloon superimposed thereon. In other words, the "close-up" view may be taken without a balloon and/or with a balloon superimposed on the still picture. It will be understood that ordinarily a plurality of guide members 30 would be provided for photographing of a plurality of "close-up" views during the course of making the complete motion picture film from the series of related still pictures and that the outlines exemplified by the outline 32A in Fig. 4 will ordinarily be in different positions on the different guide members 30, respectively, of the series of guide members for the companion still pictures. It will be understood that it is within the scope of the present invention to utilize guide members without positioning outlines of balloons thereon, and further it will be understood that said "close-up" guide members or some of them of the series may be provided with more than one balloon positioning outline thereon.

As indicated at 35 in Fig. 1, the film is preferably provided with a sound record synchronized with the picture action. Said sound record may, and preferably will, include the speaking of the words or the uttering of the sounds of the various balloons which are photographed on the film, as hereinbefore described.

The present invention may be used for filming any suitable subject matter from a series of still pictures. Without limitation, it may be stated that the invention is particularly useful in producing comic-feature films, fairy story films, educational films, etc., from still pictures or other subjects for the amusement or education of young children, and that such films may be projected directly in the home or in the theatre or may be televised for broadcast reception by television receivers. As used in the claims, the term still picture includes a stationary or an inanimate subject which may be either a two-dimensional or three-dimensional subject.

Various changes may be made in practicing the present invention without departing from the underlying idea or principles thereof within the scope of the appended claims.

Having thus described my invention, what I claim and desire to secure by Letters Patent is:

1. In a method of making a motion picture which comprises photographing a still picture on a series of successive frames of a motion picture film, the steps of placing on the still picture pre-formed guide-means for outlining a part only of the surface of said still picture for a close-up view of said part, said guide-means having means thereon for indicating the position of a balloon element to be placed on said part of the still picture, adjusting a motion picture camera for photographing said part and the balloon in close-up, placing the balloon element on said part of the picture, and, after said guide-means is removed, operating the camera to photograph said part with the balloon element thereon in close-up on a series of successive frames of the film.

2. In a method of making a motion picture which comprises photographing a still picture on a series of successive frames of a motion picture film, the steps of superposing on the still picture a member having an outlined portion for outlining a part only of the surface of said still picture for a close-up view of said part, indicating on said portion the position of a balloon element to be placed on said part of the still picture, adjusting a motion picture camera for photographing said part and the balloon in close-up, placing the balloon element on said part of the picture, and operating the camera to photograph said part with the balloon element thereon in close-up on a series of successive frames of the film.

3. In a method of making a motion picture which comprises photographing a still picture on a series of successive frames of a motion picture film, the steps of outlining a part only of the surface of said still picture for a close-up view of said part by placing on said part overlay means having means thereon for indicating the position of a balloon element to be placed on said part of the still picture, adjusting a motion picture camera for photographing said part and the balloon in close-up, placing the balloon element on said part of the picture, and, after said overlay means is removed, operating the camera to photograph said part with the balloon element thereon in close-up on a series of successive frames of the film.

4. In a method of making a motion picture which comprises photographing a still picture on a series of successive frames of a motion picture film, the steps of superposing preformed guide-means on a predetermined part of said still picture for a close-up view of said part, indicating on said guide-means the position of a balloon element to be placed on said part of the still picture, adjusting a motion picture camera for photographing said part and the balloon in close-up, placing the balloon element on said part of the picture, and, after said guide-means is removed, operating the camera to photograph said part with the balloon element thereon in close-up on a series of successive frames of the film.

5. The method of making motion picture films which comprises photographing a still picture on each of a series of successive frames, of a motion picture film, then placing on the still picture guide means having means thereon for indicating the position of a balloon element to be placed on said still picture, placing the balloon element on said still picture to correspond with said indicating means, and, after said guide means is removed, photographing the still picture with the balloon element thereon on each of a series of successive frames of the film as a continuation of said first mentioned series.

6. In a method of making a motion picture which comprises photographing a still picture on a series of successive frames of a motion picture film, the steps of placing on the still picture guide means having means thereon for indicating the position of a balloon element to be placed on said still picture, placing the balloon element on said still picture to correspond with said indicating means, and, after said guide means is removed, photographing the still picture with the balloon element thereon.

STEPHEN SLESINGER.

REFERENCES CITED

The following references are of record in the file of this patent:

UNITED STATES PATENTS

| Number | Name | Date |
|---|---|---|
| 1,226,135 | Stambaugh | May 15, 1917 |
| 1,240,774 | Pidgin | Sept. 18, 1917 |
| 1,247,051 | Wilson | Nov. 20, 1917 |
| 1,270,778 | Brixey | July 2, 1918 |
| 1,275,496 | Taylor et al. | Aug. 13, 1918 |
| 1,324,235 | Roode | Dec. 9, 1919 |
| 1,403,677 | Faas | Jan. 17, 1922 |
| 1,483,109 | Owen | Feb. 12, 1924 |
| 1,760,156 | Mann | May 27, 1930 |
| 2,246,920 | Kromholz | June 24, 1941 |

FOREIGN PATENTS

| Number | Country | Date |
|---|---|---|
| 174,622 | Great Britain | June 25, 1923 |